United States Patent
Williams et al.

(10) Patent No.: US 11,898,669 B2
(45) Date of Patent: Feb. 13, 2024

(54) SYSTEM FOR REDUCING BAND CLAMP FAILURE

(71) Applicant: International Engine Intellectual Property Company, LLC, Lisle, IL (US)

(72) Inventors: John A Williams, Palatine, IL (US); Navtej Singh, Arlington Heights, IL (US); Brandon Joseph Mueller, Aurora, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 17/835,931

(22) Filed: Jun. 8, 2022

(65) Prior Publication Data

US 2023/0400129 A1     Dec. 14, 2023

(51) Int. Cl.
*F16L 21/06* (2006.01)
*F16L 58/18* (2006.01)
*F01N 13/18* (2010.01)

(52) U.S. Cl.
CPC ............ *F16L 21/06* (2013.01); *F16L 58/185* (2013.01); *F01N 13/1844* (2013.01); *F01N 2450/20* (2013.01); *F01N 2510/08* (2013.01)

(58) Field of Classification Search
CPC ....... F16L 21/06; F16L 58/185; F16L 23/036; F16L 23/04; F16L 23/08; F16L 55/16; F16L 55/17; F16L 55/1705; F16L 55/172; F16L 55/187; F16L 59/184; F16L 59/168; F16L 2201/20; F01N 13/1844; F01N 2450/20; F01N 2510/08
See application file for complete search history.

(56) References Cited

U.S. PATENT DOCUMENTS

| | | | |
|---|---|---|---|
| 2,757,023 A | | 7/1956 | Hein |
| 5,033,435 A | | 7/1991 | Ostarello et al. |
| 5,211,695 A | | 5/1993 | Dowler |
| 2005/0264012 A1 | * | 12/2005 | Ignaczak ................. F16L 23/08 |
| 2012/0222413 A1 | * | 9/2012 | Golin ................. F01N 13/1855 |
| 2014/0339810 A1 | * | 11/2014 | Jansen ................. F16L 58/187 |
| 2017/0307117 A1 | * | 10/2017 | Gugau ................. F16L 59/168 |
| 2021/0115835 A1 | * | 4/2021 | Diehl ................. F01N 13/1855 |

FOREIGN PATENT DOCUMENTS

KR     1554172 B1 *  9/2015  ............. F16L 55/16

OTHER PUBLICATIONS

KR-1554172-B1—Machine Translation—English (Year: 2015).*

* cited by examiner

*Primary Examiner* — William S. Choi
(74) *Attorney, Agent, or Firm* — Mark C. Bach; Umang Khanna

(57) ABSTRACT

A system and a method for reducing band clamp failure on a multi-piece canister having an at least one first section coupled to an at least one second section by a band clamp, the system and method comprising a band clamp cover, wherein the band clamp cover comprises a cover first section and a cover second section, the cover first section is coupled to the cover second section at a first end by a hinge, the cover first section is coupled to the cover second section at a second end by removable fastener, the band clamp cover having a shape of the multi-piece cannister, wherein the band clamp cover has a channel that encompasses the band clamp.

5 Claims, 3 Drawing Sheets

SYSTEM FOR REDUCING BAND CLAMP FAILURE

BACKGROUND

Currently, there are concerns with a formation of stress cracks around sections of a multi-piece canister coupled by a band clamp, such as a v-band clamp and the like. Stress cracks may be induced from tensile stress, corrosion, dissimilar materials, or other outside influences. Accordingly, it is desirable to have a system for effectively protecting the area on a multi-piece cannister surrounding the clamp.

In the automotive and trucking industry, exhaust aftertreatment systems are located external to the vehicle. The exhaust aftertreatment systems often compromise a multi-piece cannisters coupled with band clamps. These aftertreatment systems are exposed to elevated temperatures, road debris, the elements, and chlorides from road salt. These external factors can facilitate early band clamp failure.

Band clamp failure on an aftertreatment system can result in internal flange failure. If the internal flanges fail, the entire aftertreatment system requires replacement. Exhaust aftertreatment systems are expensive and can result in a month of vehicle downtime waiting for replacement parts. A band clamp cover can be installed around the band clamps on the exhaust aftertreatment system to reduce external exposure and prolong the band clamp life.

SUMMARY

This disclosure relates generally to a system and a method of reducing band clamp failure. More specifically, this disclosure relates to a system and a method of reducing band clamp failure on a multi-piece aftertreatment devise on the exhaust aftertreatment system of a passenger or commercial vehicle.

DETAILED DESCRIPTION

This disclosure relates specifically to a system and a method of reducing failure of a band clamp used to couple sections of a multi-piece canister, namely an exhaust aftertreatment system and the like, located on a passenger or commercial vehicle.

Figure 1:
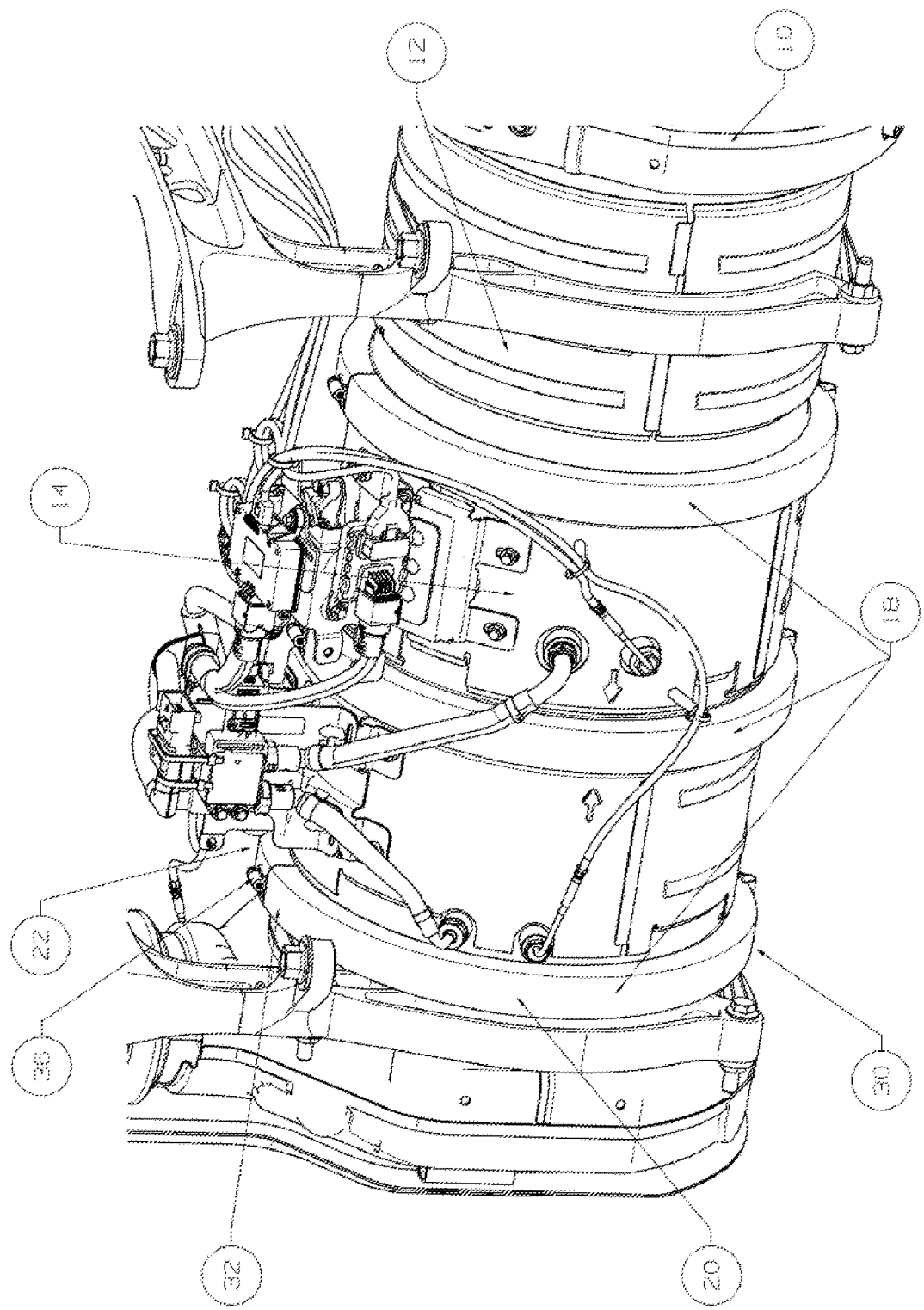
FIG. 1. is a perspective view of one embodiment of a band clamp cover installed over a band clamp on a multi-piece canister.

As shown in FIG. 1, one embodiment disclosed herein generally comprises a multi-piece cannister 10, wherein the multi-piece cannister 10 has a cannister shape and comprises an at least one first section 12 coupled to an at least one second section 14 by a band clamp 16.

The system and method for reducing band clamp failure comprises a band clamp cover 18, wherein the band clamp cover 18 comprises a cover first section 20 and a cover second section 22. The cover first section 20 is coupled to the cover second section 22 at a first end 30 by a hinge 24. The cover first section 20 is coupled to the cover second section 22 at a second end 32 by removable fastener 36, such as a screw clamp and the like.

The band clamp cover 18 is made of any appropriate material, such as a malleable foil and the like, wherein the material can tolerate temperature associated with an aftertreatment device. Such temperature may be in the range of 200 to 600 degrees Celsius. The band clamp cover 18 has a cover shape that mates with the cannister shape of the multi-piece cannister 10. The band clamp cover 18 has a channel 34 that encompasses the band clamp 16. The channel 34 allows the band clamp cover 18 to be installed without contacting the band clamp 16. The band clamp cover 18 is shaped appropriately, such as by press forming and the like, to fit on the multi-piece cannister 10.

The cover first section 20 and the cover second section 22 can separate at the second end 32, pivoting about the hinge 24, to allow installation and removal of the band clamp cover 18 on the multi-piece canister 10.

Figure 2:
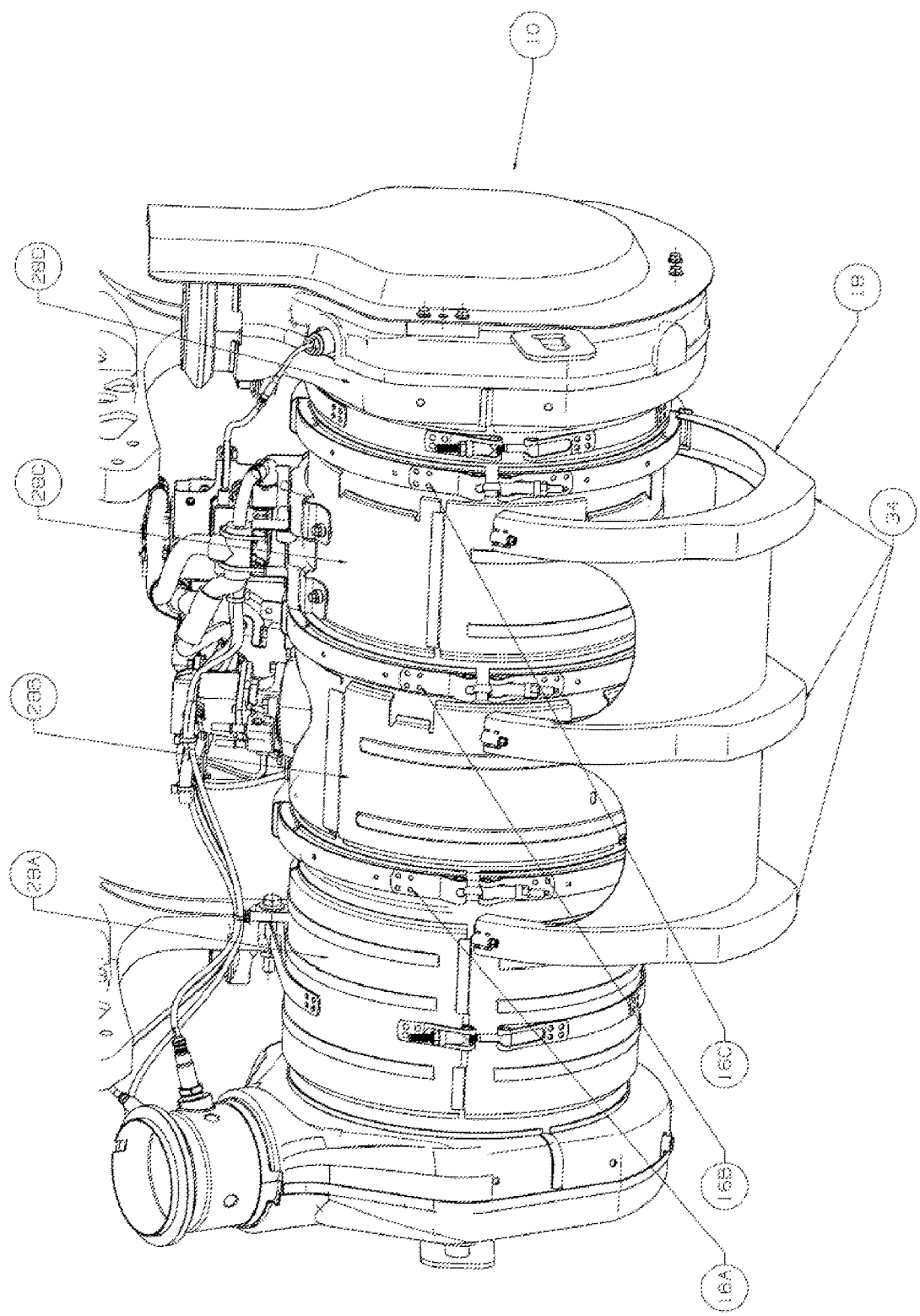
FIG. 2. is a perspective view of one embodiment of a band clamp cover partially installed on a multi-piece canister.

In some embodiments, the multi-piece cannister 10 comprises a plurality of sections 28 coupled by a plurality of band clamps 16, with four sections 28A, 28B, 28C, 28D and three band clamps 16A, 16B, 16C shown in FIG. 2. The band clamp cover 18 comprises a plurality of channels 34 that encompass the plurality of band clamps 16.

Figure 3:
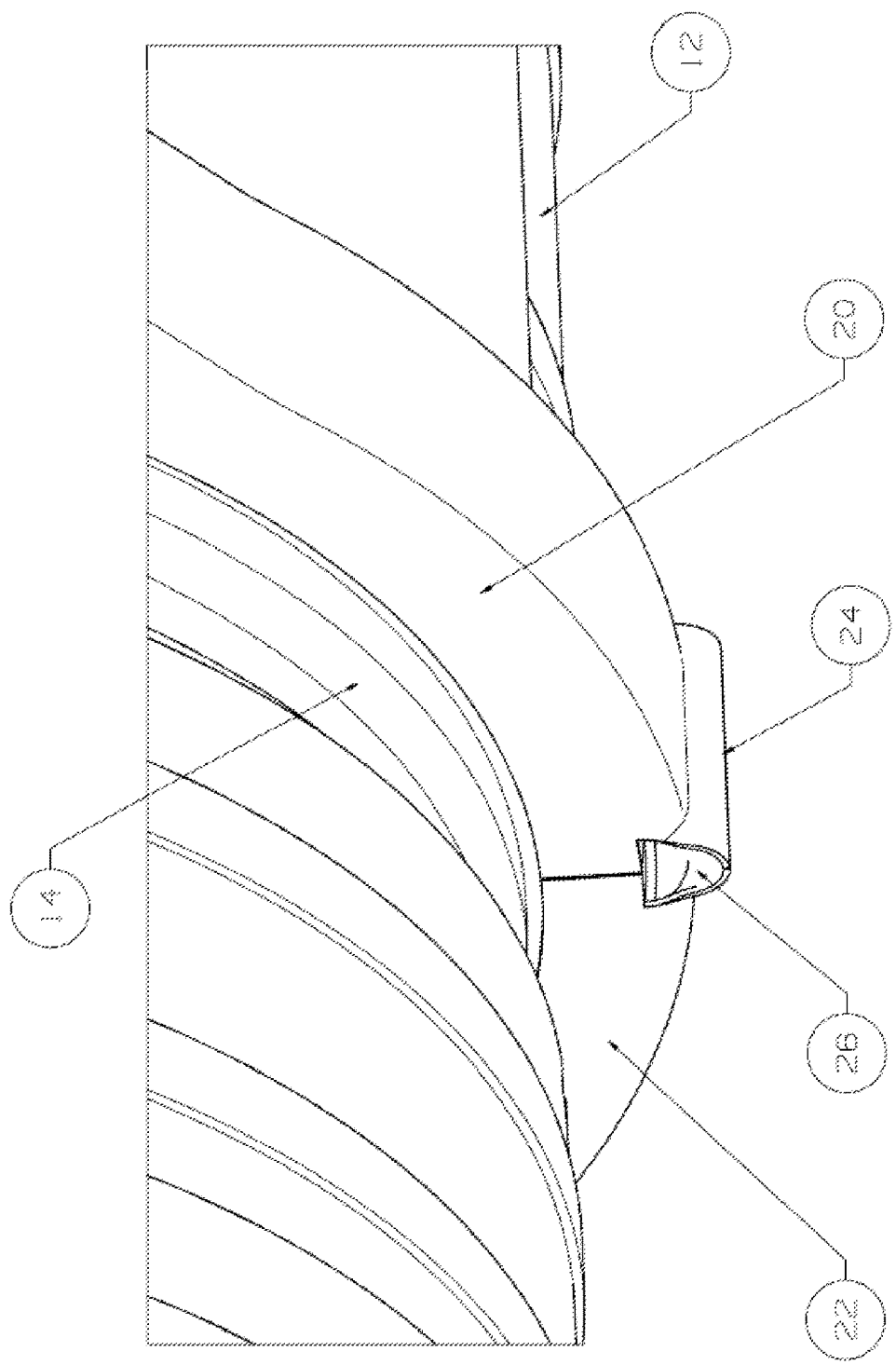
FIG. 3. is an enlarged perspective view of a band clamp cover installed over a band clamp that couples a first section and a second section of the multi-piece canister of FIG. 1.

As shown in FIG. 3, in some embodiments, the hinge 24 comprises a drain hole 26. The drain hole 26 allows fluid present in the channel 34 to leave the channel 34.

In some embodiments, the band clamp cover 18 has a corrosion reduction coating.

What is claimed is:

1. A system for reducing band clamp failure on a multi-piece cannister having a cannister shape, wherein the multi-piece cannister comprises an at least one first section coupled to an at least one second section by a respective first band clamp, the system comprising:
    a band clamp cover, the band clamp cover comprising a cover first section and a cover second section;
    the cover first section coupled to the cover second section at a first end of the band clamp cover by a hinge;
    the cover first section coupled to the cover second section at a second end of the band clamp cover by a removable fastener;
    the band clamp cover having a cover shape, wherein the band clamp cover has a first channel that encompasses the first band clamp.

2. The system of claim 1 wherein the hinge comprises a drain hole, wherein the drain hole allows fluid in the first channel to leave the channel.

3. The system of claim 1 wherein the band clamp cover is made of a malleable foil that tolerates exposure to temperatures within the range of 200 to 600 degrees Celsius.

4. The system of claim 1 wherein the multi-piece cannister further comprises an at least one third section coupled to the at least one second section by a second band clamp, wherein the respective band clamp cover includes a cover first section and a cover second section, and wherein the band clamp cover has a second channel that encompasses the second band clamp.

5. The system of claim 1 wherein the band clamp cover has a corrosion reduction coating.

* * * * *